Dec. 20, 1960   J. F. SWEENEY   2,965,894
ALTITUDE CONTROL SYSTEM
Filed Dec. 26, 1956   5 Sheets-Sheet 1

INVENTOR
J. F. SWEENEY
BY
ATTORNEY

Dec. 20, 1960        J. F. SWEENEY        2,965,894

ALTITUDE CONTROL SYSTEM

Filed Dec. 26, 1956        5 Sheets-Sheet 4

INVENTOR
J. F. SWEENEY
BY
ATTORNEY

United States Patent Office 2,965,894
Patented Dec. 20, 1960

2,965,894

ALTITUDE CONTROL SYSTEM

James F. Sweeney, Greensboro, N.C., assignor to Bell Telephone Laboratories, Incorporated, New York, N.Y., a corporation of New York Filed Dec. 26, 1956, Ser. No. 630,707

15 Claims. (Cl. 343—7)

This invention pertains to aircraft altitude control, and particularly to a system for controlling an aircraft to avoid collisions with terrain lying on its course while maintaining a fixed average altitude above terrain.

In order to reduce the possibility of collision with terrain obstacles which are either unobserved by the pilot or observed too late for avoidance, it is becoming increasingly the practice to equip aircraft with a radar beamed forwardly along its path of flight. Depending on the range of the radar and the speed and power of the aircraft, this may give the pilot an indication of such obstacles in sufficient time to permit him to take corrective action before coming so close that the aircraft would be incapable of producing the upward acceleration required for clearance. It has been proposed that such a radar be arranged to also indicate obstacles lying somewhat above and below as well as along the flight path, thereby helping to avoid collisions with other aircraft. However, even though the pilot is supplied with such information, choice of control of aircraft movement on the basis of it remains a matter for pilot decision. It is often difficult for him to visualize the required avoidance path relative to the terrain quickly and accurately, particularly in mountainous regions. With the ever-increasing speeds of modern aircraft, the facility with which a correct decision is reached as to when and how steeply to cause the aircraft to climb may spell the difference between safe passage and collision with a sudden rise in terrain.

One possible method of avoiding collisions with terrain is simply to head the aircraft on a straight line course directed at the crest of the highest of all terrain obstacles within radar range. However, in areas containing mountain peaks, this would require sustained flight for long distances at high altitudes. The existence of adverse weather conditions above a certain altitude, or intolerable upper air turbulence, very often makes such flight impracticable if not altogether impossible. In addition, the increasingly crowded condition of most airlanes often makes it necessary for the various aircraft in a given area to adhere to closely maintained flight altitudes in order to minimize the chances of collision in flight. In view of these factors the pilot may find it necessary to fly at a relatively low average altitude, only exceeding it during the intervals required for clearing higher obstacles lying on his course.

This problem is exaggerated in connection with military aircraft when the flight path must be at an altitude sufficiently close to terrain to minimize vulnerability to radar detection. There is then maximum danger from sudden elevations in terrain, so that an automatic system for causing the aircraft to climb when approaching such obstacles may be virtually a necessity. A rapid descent to the desired average altitude after clearing each obstacle is also of major importance, and may be accomplished much more quickly and safely by an automatic system than by pilot control.

Pilot judgment can be eliminated in such situations if the general profile of the terrain to be encountered in the flight plan is analyzed in advance, the climbing ability of the aircraft is known, and a system is devised for utilizing these factors continuously to control the altitude of the aircraft to remain at an average value preselected by the pilot. The mode of control may be fully automatic, by including an autopilot in the system, or it may be by providing a signal to tell the pilot when the aircraft should climb and when it should descend.

Accordingly, it is an object of this invention to provide means for controlling an aircraft to safely clear terrain obstacles.

A further object is to provide means for controlling an aircraft to remain at a substantially constant average altitude above the terrain lying on its course while also controlling it to clear any sudden elevations in terrain.

In one embodiment the invention comprises a control system carried by the aircraft which includes means for measuring the range to terrain along several beams oriented at different angles relative to the velocity vector of the aircraft but lying in a common vertical plane which includes that vector as a line of reference. The angle of one beam may be zero, so that the range along that beam will be in a direction aligned with the velocity vector. Other beams are directed downward from the velocity vector, and the remaining beams are directed upward. In most cases range measurements along three beams will suffice, the beam at the highest upward angle being denoted the high beam, the one at the lowest downward angle being denoted the low beam, and the one aligned with the velocity vector being denoted the middle beam. The control system also includes means for comparing the measured range to terrain of each beam with a preassigned distance which is greatest for the high beam, smallest for the low beam, and of intermediate values for the remaining beams. If the range along any beam is greater than the distance assigned to that beam the comparing means produces a negative deviation signal of a magnitude proportional to the excess. If the range is less than the assigned distance, a positive deviation signal is produced of a magnitude proportional to the deficiency. The deviation signals for all beams are applied to a signal selector which develops a positive control signal when any of the deviation signals are positive but develops a negative control signal when at least one deviation signal is negative and none are positive. The magnitude of the control signal is, in each case, determined by the magnitude of the deviation signal producing it, and may be utilized to operate an autopilot in a fully automatic control system which causes the aircraft to pitch upward when the control signal is positive and to pitch downward when the control signal is negative. If the control signal is zero, the autopilot will maintain the aircraft at its existing pitch attitude. Alternatively, the control signal may be utilized to operate a visual indicator which tells the pilot whether to set the aircraft elevator controls for an upward pitch, or a downward pitch, and the required pitch magnitude in each case, or when to adjust them for a downward pitch, and whether to maintain an existing pitch attitude.

When the aircraft is in level flight over terrain which is not high enough to intersect any but the low beam the deviation signals for all other beams will be negative. The deviation signal for the low beam will become positive if the aircraft should rise above the altitude corresponding to the distance assigned to the low beam, and will become negative if the altitude drops below that value. Consequently, level flight is maintained at an altitude such that the low beam deviation voltage is maintained equal to zero. That is, the low beam is then in control of the aircraft. Suppose now that the aircraft approaches a rise in terrain high enough to intersect its flight path. While still at the relatively long distance from such an obstacle equal to the distance assigned to the middle beam the deviation signal from that beam will become positive. The resultant positive control signal will cause the aircraft to climb toward the crest of the obstacle at a flight path climb angle such that the range to the obstacle along the middle beam is maintained at the distance assigned to that beam. In that situation the deviation voltage for the middle beam will be balanced at zero. After having come close enough to the obstacle so that the range along the low beam now becomes less than its assigned distance, the incipient positive deviation signal from that beam causes the climb angle to further increase to maintain the low beam deviation signal balanced at zero. Eventually, when the range along the low beam becomes less than the distance assigned thereto, the climb angle will further increase to a value such that the low beam remains tangent to the crest of the obstacle. To a first approximation, it may be considered that this condition persists until the aircraft has cleared the crest. However, it is realized that the aircraft would then reach the crest with a clearance altitude of zero. Disabling means described hereinafter are included therefore to insure safe clearance of crests.

In the case of extremely high terrain, the high beam comes into action when the aircraft is still a relatively long distance away corresponding to the distance assigned to that beam. The aircraft is thereby caused to begin climbing very early in its approach to the obstacle, and after coming near enough so that the range along the middle beam becomes equal to its assigned distance the flight path climb angle will be controlled as required by the middle and low beams the same as in the case described in the preceding paragraph. A "head-start" is thereby given to the aircraft to assure clearance of obstacles of very great heights relative to the average flight altitude.

Other objects and features of the invention will be apparent from the following specification and accompanying drawings, in which:

Fig. 11 is a circuit diagram of a typical signal selector suitable for use in the circuit of Fig. 7.

Figure 1:
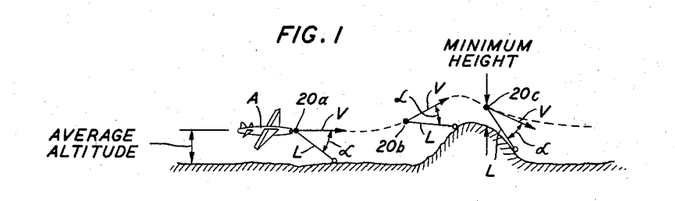
Fig. 1 illustrates the behavior of an aircraft in clearing a relatively low hill in response to control by a low beam.

In Fig. 1 aircraft A is initially in position 20a in level flight in a direction designated by the velocity vector V. To simplify the description the velocity vector is shown aligned with the longitudinal axis of the aircraft. Of course, it is recognized that this condition does not necessarily exist, and that angular displacement between the vector and the axis can occur both laterally and vertically. However, by use of well known course computing techniques the direction of the velocity vector can always be established. As shown, if the aircraft should continue on its existing flight path it would crash into the side of a sudden rise in terrain such as a hill or a mountain. The control system carried by the aircraft includes an antenna and radar unit which produces a conical or "pencil" type radar beam L directed downward at an angle of elevation $\alpha$ below the velocity vector V. In this specification all beam angles will be denoted "angles of elevation" since, even though some are directed downward from the velocity vector, the word "elevation" is only used to denote the fact that these angles differ in a vertical rather than a horizontal sense. The control system compares the range of beam L to terrain with a preassigned distance $l$, and causes the aircraft to pitch upward if that range is less than $l$ and to pitch downward if it is greater than $l$. If the range is equal to $l$ the existing pitch attitude is not disturbed.

When aircraft A comes near enough to the obstacle so the range of beam L tends to become less than $l$, the control system will cause it to pitch upward. Continued approach of the aircraft therefore results in a gradually increasing climb angle such that the range of beam L is always maintained at the value $l$, just grazing the contour of the obstacle at that distance. Position 20b denotes a point in this part of the flight path, vector V being directed upward from beam L at the same angle $\alpha$ as before. Proceeding in this manner, a point is reached in the flight path at which beam L becomes tangent to the crest of the obstacle, and the radar range tends to become greater than $l$. The control system then causes the aircraft to pitch downward at an angle such that the range is again restored to the value $l$, beam L just grazing the contour of the opposite side of the obstacle. At some points in the dive path, due to the geometry involved, the vertical altitude above terrain will become less than the desired average altitude. Position 20c shows the point in the dive path where the minimum altitude is reached. After this, the continued leveling off finally results in a horizontal flight path again at the desired average vertical altitude at which the range of beam L is again equal to $l$.

Both the average altitude and the minimum altitude above terrain may be increased by increasing the value of the assigned distance $l$. Increasing the angle $\alpha$ would also achieve this result, but only at the expense of permitting a closer approach to an obstacle before initiating a climb. This would increase the required angular and vertical accelerations, and so is limited by the climbing ability of the aircraft. Consequently, it is preferable to adjust the altitudes involved by controlling the value of $l$, the angle $\alpha$ being chosen on the basis of the characteristic of the particular aircraft involved and the permissible angles of climb.

Figure 2:
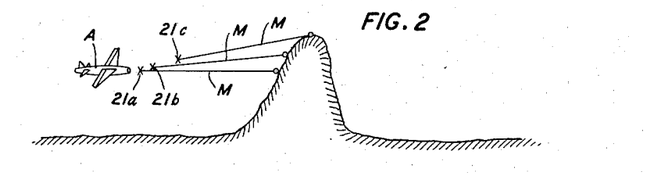
Fig. 2 illustrates the behavior of an aircraft in response to control by a middle beam as an approach is made to a moderately high obstacle which intersects the flight path.
Figure 2:
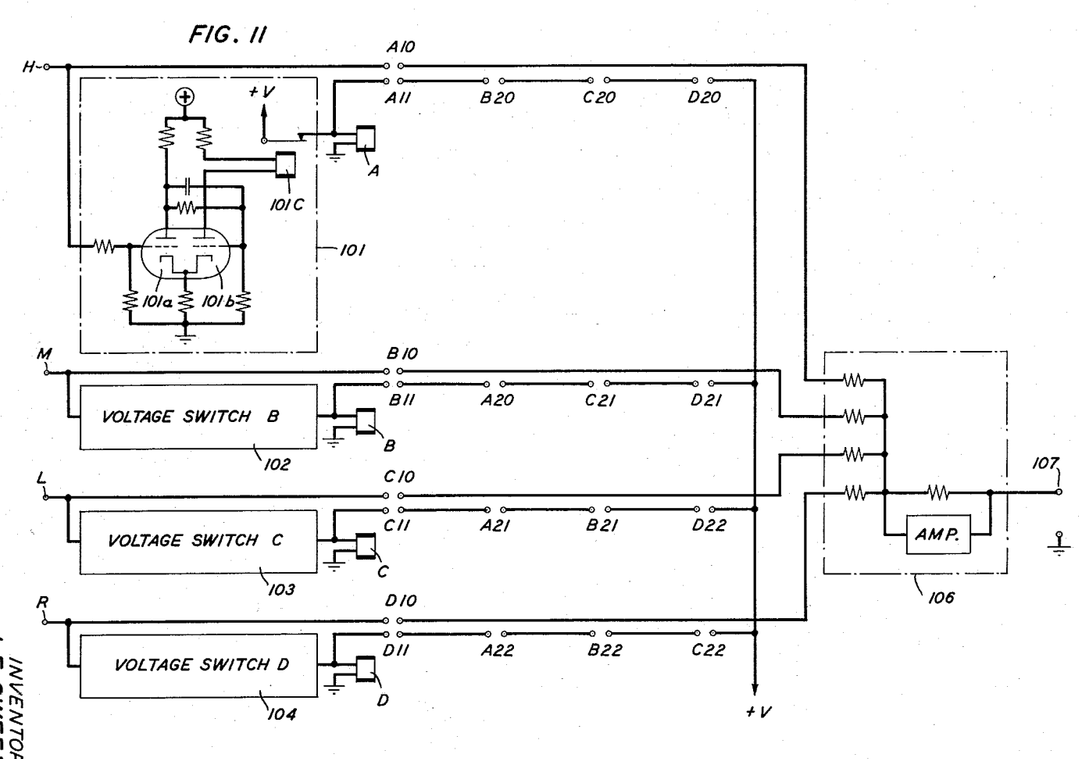

Fig. 2 shows the mode of control of an aircraft A by a control system having an antenna and radar unit which produces a pencil type radar beam M similar to beam L described above with reference to Fig. 1, but directed along the velocity vector of the aircraft instead of below it. In position 21a aircraft A is still on a horizontal flight path and is approaching a moderately high obstacle with which it will collide if no avoidance action is taken. It has just reached a distance from the obstacle equal to the distance $m$ assigned to beam M by the control system, $m$ being greater than the distance $l$ described above with reference to Fig. 1. The position of beam M when aircraft A is in position 21a is shown by the horizontal line extending from that position, the line length being drawn proportional to $m$. Since continued horizontal approach to the obstacle would result in making the range along beam M less than $m$, the control system causes aircraft A to climb at an angle which maintains these quantities equal. Position 21b illustrates the situation which exists somewhat later than that at position 21a, beam M now being located as shown by the line extending from that position to the obstacle. The length of this line is the same as the length of the horizontal line from position 21a, since the distance assigned to beam M remains constant. The scales of the various lines in Fig. 2, as well as those in the illustrations of flight paths in all figures, have been distorted to some extent for the purpose of clearly depicting the operation of the systems involved without requiring an inordinately large drawing.

As aircraft A comes still closer to the obstacle, a position 21c is reached at which the distance to the obstacle along beam M is less than $m$ except when the beam is just tangent to the crest of the obstacle. From that position onward, any drop in the angle of climb would reduce the range of beam M to less than $m$ and so result in a corrective increase in that angle. Similarly, any increase in the angle of climb would cause beam M to pass over and clear the crest. The resultant negative deviation signal would then cause a downward pitch to reduce that angle. Therefore the beam and, consequently, the angle of climb, will be maintained tangent to the crest and the flight path of aircraft A will be a straight line directed toward the crest.

Figure 3:
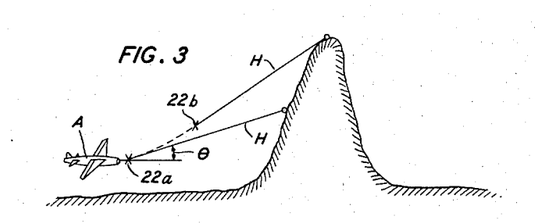
Fig. 3 illustrates the behavior of an aircraft in clearing a high mountain peak in response to control by a high radar beam.

Fig. 3 shows the mode of control of an aircraft A by a control system comprising an antenna which produces a pencil type radar beam H similar to beam M described above with reference to Fig. 2, but directed at an angle of elevation $\theta$ upward from the velocity vector of the aircraft. Beam H has a distance $h$ assigned to it in the same manner as distance $m$ is assigned to beam M in Fig. 2, but $h$ is considerably greater than $m$. Control of the aircraft by beam H is very similar to the case of control by beam M, the major difference being that here the aircraft flight path remains $\theta$ degrees below beam H instead of lying along it. When the aircraft is in position 22a, where it is still on a horizontal flight path but approaching a very high obstacle, beam H is directed $\theta$ degrees above the horizontal. The length of the line at this angle in Fig. 6 has been drawn proportional to $h$, because it is assumed that the range along beam H to the obstacle has just become equal to $h$. Continued horizontal flight would make the range to the obstacle less than $h$, so the control system causes the aircraft to climb. The climb angle increases as the aircraft comes closer to the obstacle, maintaining beam H just grazing the contour at a range equal to $h$. At position 22b beam H becomes tangent to the crest, so that the flight path then continues in a straight line. It is evident that the clearance altitude would be zero if no other beam was provided to further increase the angle of climb after the aircraft comes near the crest. That is, the function of a high beam such as H is to provide an initial climb far in advance of very high obstacles, thereby making the required further increase in climb angle after coming closer to the obstacle much smaller than if climbing was first initiated at a lesser distance. Accordingly, while beam H assures that the aircraft will be able to clear the obstacle, at least one more beam is needed to take control before coming overly close.

Figure 4:
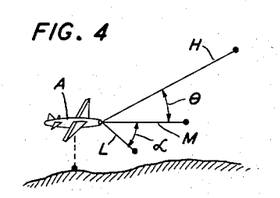
Fig. 4 shows the geometrical relationship between three radar beams utilized to control an aircraft in accordance with the invention.
Figure 5:
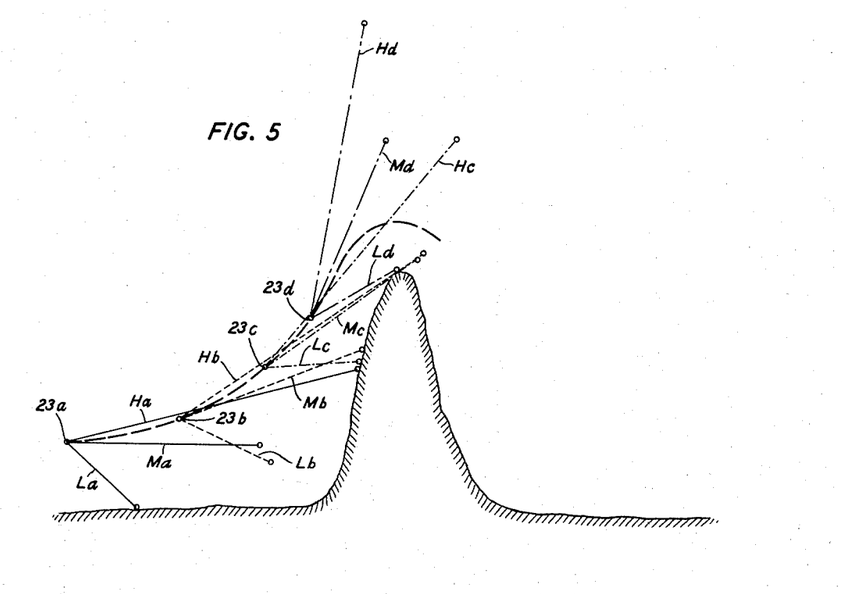
Fig. 5 illustrates the behavior of an aircraft which is controlled by three radar beams arranged as shown in Fig. 4 when approaching a high mountain peak.

A control system utilizing a combination of low, middle and high beams such as L, H and M described above would result in the beam control pattern shown in Fig. 4. Beams L, H and M are oriented relative to the velocity vector of the aircraft A in the manner as described above, and their assigned distances $l$, $m$ and $h$ are successively greater in that order. Fig. 5 shows the manner in which these three beams will cooperate to bring an aircraft safely over a high mountain and back to a desired average altitude above terrain after clearing it. Initially the aircraft is at position 23a and beams L, M and H are respectively directed as shown by lines La, Ma and Ha. The lengths of these lines have been drawn proportional to the distances assigned to the corresponding beams. The flight path is still horizontal, but the range along high beam H to the mountain has just become equal to $h$. The range along low beam L to the terrain below is equal to $l$. The range along middle beam M to the mountain is greater than $m$, but this does not affect the aircraft because any downward pitch would reduce the range along beam L to a value less than $l$ and so result in a corrective climb. As stated above, and by means described in more detail hereinafter, the control system is designed so that any beam which calls for an upward pitch takes precedence over all beams calling for a downward pitch.

As the aircraft proceeds toward the mountain the range along beam H tends to become less than $h$, and so results in the aircraft being caused to climb at an angle such that beam H just gazes the contour of the mountain at a range equal to $h$. This will eventually result in the velocity vector of the aircraft being so directed that beam H is tangent to the crest of the mountain. The flight path then proceeds at gradually increasing climb angles, maintaining tangency, until at position 23b the range along beam M becomes equal to its assigned distance $m$. In this position the three radar beams are directed along lines Lb, Mb and Hb, the lengths of which are the same as previously. Now the climb angle of the aircraft must be increased so that, in spite of the continually decreasing distance to the mountain, the range along beam M will remain equal to $m$. Upper beam H no longer is in control since it is now directed outward into space and will therefore have an indefinite range and a negative deviation signal.

After the aircraft has climbed to position 23c the range along low beam L becomes equal to $l$ and the three radar beams are directed along lines Lc, Mc and Hc. From this position onward the climb angle of aircraft A is continually increased to maintain the range along beam L equal to $l$, middle beam M no longer playing a part in control of the aircraft. This behavior continues until at position 23d beam L becomes tangent to the crest of the mountain. The climb angle is then held fixed until the crest is cleared by a disabling unit described hereinafter which operates when the range along low beam L becomes indefinitely large.

After clearing the crest of the mountain all beams are directed outward in space, so all will call for the aircraft to pitch downward. It will do so, but after a relatively short time the range to terrain along one of the beams will tend to become less than its assigned distance. A positive deviation signal is then produced, and results in a reduction of the downward pitch. Since beam H has the longest assigned distance, this beam will normally be the first to produce such a signal. Which beam is actually the first to do so will depend on the relative beam angles and ranges, the angle of downward pitch, and the contour of the opposite side of the mountain. These quantities may be so related that low beam L is the first to produce a positive deviation signal, due to its range to the opposite side of the mountain becoming less than $l$. In such case, reduction of the downward pitch angle will be effected in response to control by beam L. Assuming, however, that beam H is the first to react as described, on descending still closer to terrain the range of middle beam M tends to become less than $m$, causing the pitch angle to be still further reduced. Finally, the aircraft comes near enough to the now substantially level terrain below so that the range along beam L becomes equal to $l$. The flight path then levels off horizontally at the same altitude as when the aircraft approached the mountain.

Figure 6:
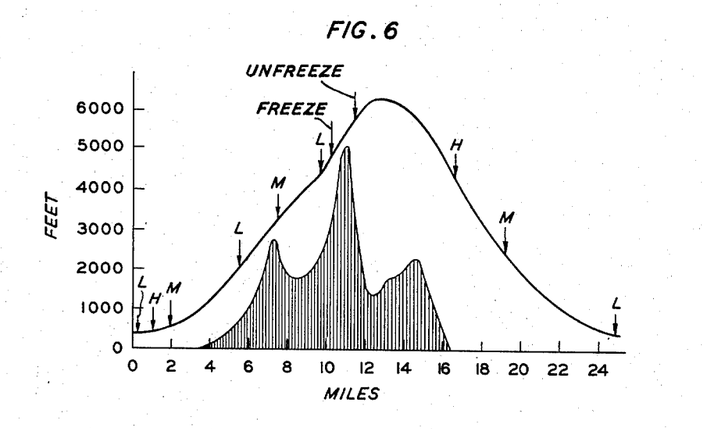
Fig. 6 is a chart showing a computed flight path for a typical aircraft controlled by the three radar beams of Fig. 4 when approaching a 5200 foot mountain peak.

The performance of a typical high speed aircraft controlled by three radar beams as described in Fig. 5 has been calculated on an analog computer for a mountain peak approximately 5200 feet high. The calculated flight path is shown in Fig. 6, and was determined for the case of control by three beams L, M and H having assigned distances of 1, 4 and 9 miles, respectively. The angles α and θ were each assumed to be 4 degrees. The points on the flight path marked L, M and H indicate which beam was controlling the aircraft from each such point to the next. The points marked "freeze" and "unfreeze" have a significance which will now be explained.

Suppose the aircraft is being controlled by low beam L to clear the crest of an obstacle. After coming close enough so the range along that beam becomes less than its assigned distance *l*, the control system as described will maintain an angle of flight such that the low beam is maintained tangent to the crest. If this situation persisted, just as the aircraft was about to clear the crest the requirement of beam tangency would cause the flight path to curve downward and result in a clearance altitude of zero. To prevent this situation, it is necessary to provide means for disabling all negative deviation signals for a brief period immediately following the instant at which the range along the low radar beam becomes very much larger than its assigned distance. This interval may be only a few seconds, during which the aircraft will continue past the crest at the angle of climb which existed before the low beam suddenly started producing a negative deviation signal due to the excessive range. After that interval the disabling means has no further effect and normal control of the aircraft is restored to the various beams. It will thereby be caused to descend to the desired average altitude as described above with reference to Fig. 5. The point marked "freeze" in Fig. 6 denotes the aircraft position where all negative deviation signals were cut off, while that marked "unfreeze" denotes the position where all deviation signals were again permitted to enter into production of the resultant control signal.

A further feature of the invention involves means for continuing to control the aircraft to remain at a desired average altitude even when its flight carries it over a body of water. As is well known, water is a very poor radar reflector for small angles of incidence of the radar beam. Consequently, in the absence of some auxiliary means to prevent it from doing so, the aircraft would be caused to pitch downward as a result of failure of all controlling beams to produce range signals. A radio altimeter, however, does operate satisfactorily over water as well as over land because of the approximately 90 degree angle of incidence of its beam to the surface below, so that it is desirable to turn control of the aircraft over to such an instrument whenever the altitude above the surface below tends to become less than a preselected safe value. The complete control system should, therefore, include a radio altimeter.

Of course, failure of the radar system would also result in loss of range signals from the various controlling beams and, therefore, in production of a negative control signal by the described control system. As a safety feature, therefore, it may be desirable to include means for monitoring the persistence of range signals from minor lobes of the controlling beam which are directed vertically downward when the aircraft is in level flight. Lack of range signals from this direction when the aircraft is at an altitude equal to or less than the desired average altitude is a certain indication of radar failure. In that event the monitoring means could be designed to produce either a trouble indication or a positive deviation signal which would be utilized by the described control system to pitch the aircraft upward.

Figure 7:
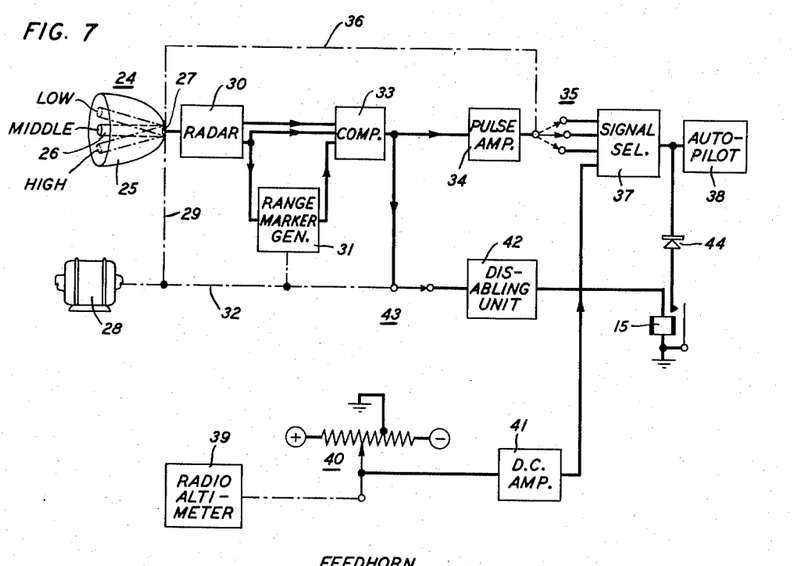
Fig. 7 is a circuit diagram, mostly in block form, of a control system for effecting the mode of aircraft terrain avoidance called for by the invention.

In Fig. 7 is shown a suitable control system, mainly in block form, for controlling an aircraft with three radar beams as described above. The system includes an antenna 24 having a circular parabolic reflector 25 and a feedhorn 26 so mounted about a pivot 27 that it can be oscillated relative to the reflector in a substantially vertical single plane. It is assumed that the entire control system is carried by the aircraft to be controlled, and that suitable means are provided for aligning the axis of reflector 25 with the velocity vector of the aircraft. A motor 28 is mechanically coupled to feedhorn 26 by a linkage 29 which it drives so that the feedhorn is caused to oscillate between three positions designated "high," "middle" and "low." This provides a type of antenna motion known in the radar art as "vertical sector scan." Oscillating feedhorn arrangements of this type are well known, being discussed, for example, on pages 67 through 69 of "Radar Scanners and Radomes," vol. 26, Massachusetts Institute of Technology Radiation Laboratory Series, McGraw-Hill Book Company, Inc., 1948. The angle of feedhorn 26 relative to the axis of reflector 25 establishes the angle of the resultant pencil radar beam relative to that axis and, consequently, relative to the aircraft velocity vector. When feedhorn 26 is in the "middle" position the beam is directed along the velocity vector, in the "high" position it is directed at an angle upward of the vector, and in the "low" position it is directed downward of the vector.

In order to improve the accuracy of range measurement by the three beams it is desirable that feedhorn 26 remain in each of the selected three positions for longer periods than the time required for movement between those positions. A suitably shaped cam having three segments at each of which no motion is imparted to feedhorn 26 may be included in mechanical linkage 29 to effect "dwelling" of this kind. While an oscillating feedhorn has been shown as the means of obtaining the requisite three beams, an alternative arrangement would be to fix feedhorn 26 relative to reflector 25 and to rock the entire assembly. This is a well known method of producing a sector scan, many scanners of this type being described in the textbook "Radar Scanners and Radomes" cited above. Still another alternative would be to use three feedhorns and to cyclically switch between them, but the single feedhorn arrangement is preferred because it minimizes the complexity of the antenna.

Feedhorn 26 is connected to a radar unit 30. This may be of any conventional type for producing range signals along definite beam angles, but for definiteness is assumed to be of the pulse type comprising the usual oscillator, modulator, receiver and TR box for permitting the same antenna to be used for both transmitting a pulse and receiving its echo. The modulator is also used to produce trigger pulses which "key" the time at which each pulse is transmitted. The trigger pulses are also applied to a range marker generator 31 connected to radar unit 30. In response to each trigger pulse the latter starts timing out an interval at the end of which it produces an output pulse called a "range marker." This interval may be established at any one of three different preset values, respectively corresponding to the distances assigned to the low, middle and high radar beams. It is necessary that the range marker produced in response to a given trigger pulse be the one corresponding to the distance assigned to the beam then being produced by antenna 24. To achieve this synchronous relationship, the intervals timed out by generator 31 may be controlled by a three-contact switch the arm of which is cyclically driven between its contacts by motor 28 via a mechanical linkage 32 in synchronism with the oscillation of feedhorn 26. Linkage 32 may simply comprise a shaft connected to the arm of such a switch through a cam the same as utilized in linkage 29. A suitable switch and circuit for generator 31 are described hereinafter with reference to Fig. 8.

The range signals, which here are echo pulses, are received by antenna 24, detected by radar unit 30, and applied to a comparator 33. Comparator 33 is also supplied by radar unit 30 with the trigger pulses which actuate range marker generator 31, and by that generator with the range markers it produces. Since each trigger pulse initiates production of both a transmitted radar pulse and a range marker, as described above, each echo pulse from a particular one of the low, middle and high beams is compared in comparator 33 with a range marker at the particular present interval corresponding to the distance assigned to that beam. It is, of course, necessary that any of the intervals timed out by range pulse generator 31 be less than the intervals between successive transmitted radar pulses. This permits the next trigger pulse produced by radar 30, preparatory to production of the next transmitted pulse, to reset comparator 33 to its initial state before a new echo pulse and range marker are applied to the comparator for comparison. In addition, the interval between transmitted pulses of radar unit 30 should be much less than the interval of "dwelling" of feedhorn 26 at any one of its three positions, so that for each of the three beams a large number of paired echo and range marker pulses will be applied to comparator 33.

The circuit of comparator 33 is so constructed that, if a particular radar echo pulse is applied to it before the associated range marker, it produces a positive output pulse proportional in amplitude to the time delay involved. If, conversely, the range marker should precede the echo pulse, a negative output pulse proportional in amplitude to the time delay involved is produced. When the range marker and echo pulses are coincident in time of application to the comparator, its output is zero. Range pulse generator 31 is adjusted so that it produces a range marker for application to comparator 33 at the same instant as an echo pulse is produced by radar 30 for similar application when the range of the beam associated with that range marker is equal to its assigned distance. This adjustment, consequently, establishes the preset intervals of the three range markers for the three beams described. The production of positive output pulses by comparator 33 will indicate that the range to terrain of the beam then being produced by antenna 24 is less than the distance assigned to that beam. If negative output pulses are produced by comparator 33 that will indicate that the range to terrain is greater than the assigned distance of the beam then being produced. This determination occurs cyclically for the low, middle and high radar beams, by virtue of the described oscillation of feedhorn 26 in synchronism with the switching of the three range markers produced by range pulse generator 31.

The output pulses produced by comparator 33 are the "deviation signals" referred to above, and are applied to a pulse amplifier 34 connected to the arm of a three-contact switch 35. Amplifier 34 is designed so it does not introduce any polarity inversion, and so that in the absence of an applied pulse its output voltage is zero. The arm of switch 35 is driven by motor 28 via a mechanical linkage 36 so that it is closed to its high, middle and low contacts when feedhorn 26 is in the high, middle and low positions, respectively. Consequently, after amplification in amplifier 34 the deviation signals produced by comparator 33 for the high, middle and low beams appear at the high, middle and low contacts of switch 35. In this manner, even though the movement of feedhorn 26 through intermediate positions between the three desired ones may result in production of undesired echo pulses, these are isolated at switch 35 and do not affect the overall operation of the control system.

The contacts of switch 35 are connected to individual channels of a signal selector 37. This device functions to provide a positive output voltage whenever the deviation signal produced by comparator 33 for any one or more of the three radar beams is positive. The amplitude of this positive voltage will be proportional to the amplitude of the deviation signal which produced it, or to the sum of the positive deviation signal amplitudes when more than one such signal is present. Signal selector 37 produces a negative output voltage only when the deviation signal for at least one beam is negative and no deviation signal is positive. The amplitude of this negative voltage will be proportional to that of the deviation signal which produced it, only the last deviation signal to become negative being effective in producing a negative output voltage from signal selector 37.

The output voltage from signal selector 37 constitutes the "control signal" referred to previously, and may be applied either to a visual indicator which tells the pilot how the aircraft elevator controls should be operated or to an autopilot which automatically operates those controls. An arrangement of the latter type is shown in Fig. 7, the autopilot being designated in block 38. Essentially, it comprises a reversible motor which drives the elevator controls in a direction to produce an upward pitch when the signal selector output voltage is positive and in a direction to produce a downward pitch when that voltage is negative. In each case, the pitch angle is determined by the magnitude of the control signal. Autopilot arrangements of this type are currently in commercial use. As an alternative to utilizing the control signal to directly operate autopilot 38, it may be desirable to utilize it for operating a motor which controls the orientation of the supporting structure of antenna reflector 25 relative to the velocity vector of the aircraft. A servo loop could then be interposed between the supporting structure of the antenna and the autopilot to control the pitch of the aircraft to maintain the velocity vector in line with the axis of reflector 25. By including smoothing filters in such a servo loop, momentary rapid variations in the positioning of antenna 24 produced by the control system in response to minor irregularities in terrain would have no effect on the aircraft. However, the average pitch of the aircraft would be controlled just as if signal selector 37 directly actuated the autopilot. A smoother type of flight control can thereby be attained.

Another portion of the circuit of Fig. 7 involves radio altimeter 39, which measures the altitude of the aircraft relative to the terrain below. Various types of radio altimeter circuits are described on pages 131 to 136 of the text "Radar Aids to Navigation," volume 2, Massachusetts Institute of Technology Radiation Laboratory Series, McGraw-Hill Book Company, Inc., 1947. While these are designed to provide an altitude indication on a meter or cathode ray tube, it will be evident to those skilled in the art that by inclusion of a servo loop the altimeter may be caused to rotate a shaft to a position proportional to the measured altitude. In Fig. 7, altimeter 39 is utilized to drive the brush of a potentiometer 40. Across the potentiometer terminals is applied a direct current voltage which is "floating" with respect to the ground potential of the entire circuit. A movable tap on the potentiometer is connected to ground, and is set to be at the same position as the brush when the aircraft is at the minimum flight altitude which appears to be safe. This will normally be less than the desired average flight altitude. The polarity of the direct current voltage across potentiometer 40 is established so that the brush is driven toward the positive terminal as the altitude of the aircraft decreases and toward the negative terminal as the altitude increases. The brush of potentiometer 40 is connected to a direct current amplifier 41, the output of which is connected to signal selector 37 in the same manner as the contacts of switch 35 described above.

Altimeter 39 will cause a continuous negative deviation signal to be applied to signal selector 37 so long as the aircraft remains above the lowest safe altitude. Accordingly, the altimeter will have no direct effect on the control of the aircraft unless all the radar beams should call for the aircraft to pitch downward. This will occur if the flight course reaches a large body of water, since virtually no radar echoes will then be received. The aircraft will pitch downward and descend, but after reaching the altitude corresponding to the setting of the tap of potentiometer 40 a further drop in altitude will cause altimeter 39 to move the arm of potentiometer 40 so as to apply a positive deviation signal to signal selector 37. Since a positive deviation signal takes precedence over all negative deviation signals applied to the signal selector, it will result in a control signal which causes the aircraft to climb. The aircraft therefore levels off at the altitude referred to. Once having taken control in this way, altimeter 39 will remain in control until the aircraft flight course again reaches land. Normal control by the described radar beams will then be resumed since at least the low beam will then produce a positive deviation signal.

A further refinement of the circuit of Fig. 7 is inclusion of the "disabling" unit designated in block 42. This comprises a circuit which is connected at its input terminal to comparator 33 through the contact of a switch 43. The arm of switch 43 is cyclically brought to its contact when feedhorn 26 is in the low position, this being accomplished by utilizing mechanical linkage 32 to drive the switch arm. This is the same linkage which, as described above, is utilized for switching the range markers produced by range pulse generator 31 in synchronism with the oscillation of feedhorn 26. The output terminal of disabling unit 42 is connected through the winding of a relay 15 to ground. The armature of relay 15 is grounded, and its contactor is connected through a positively poled diode 44 to the output terminal of signal selector 37. Consequently, when relay 15 is operated the potential of the control signal produced by signal selector 37 cannot drop below ground.

When the low beam fails to produce any echo pulse in the interval between successive trigger pulses from radar unit 30, disabling unit 42 is actuated to produce a direct output voltage which operates relay 15. As a result, if the deviation signals then applied to signal selector 37 are negative the potential of the control signal produced by the latter will be held at ground level, or zero. If the deviation signals are positive, however, the control signal will not be affected by relay 15. In terms of control of the aircraft, while relay 15 is operated the control system can cause the aircraft to pitch upward but not downward. If no upward pitch is called for an existing flight path will be maintained. A preset interval after disabling unit 42 is actuated, which interval is established by its design and may be of the order of four seconds, it stops producing output voltage. This releases relay 15, permitting the control system to resume normal operation. In addition, disabling unit 42 disables itself for a longer interval, of the order of 15 seconds. Consequently, even though the low beam may still not produce echo pulses at the end of the preset four second interval, signal selector 37 can then produce a negative control signal. After the 15 second interval, disabling unit 42 will return to its quiescent state ready to operate again in the event of echo pulse failure from the low beam as described.

The purpose of disabling unit 42 is to provide for the situation, previously referred to, wherein when the aircraft reaches a position in its flight path where the low beam is tangent to the crest of an obstacle at a range along the beam equal to its assigned distance $l$ the deviation signals for all beams are negative and tend to cause a downward pitch before the aircraft is safely past the crest. In particular, the low beam is the most critical one in that situation since it is the last beam to be producing a positive deviation signal. When that beam suddenly clears the crest the range to the terrain on the opposite side of the obstacle may be so great relative to the distance assigned to the low beam that no radar echo pulse occurs in the interval between production of a range marker for that beam and the trigger pulse which results in the next transmitted radar pulse. Comparator 33 therefore produces the maximum possible negative deviation signal corresponding to the low beam. By "freezing" the elevator controls of the aircraft against control signals which call for a downward pitch for a few seconds, disabling unit 42 assures that the preexisting angle of climb of the aircraft over an obstacle will be continued long enough to fully clear the crest.

After clearing the crest, which is also after the short preset interval established by disabling unit 42, the aircraft must be returned to the desired average altitude. At that time, assuming no higher obstacles are present beyond the crest just cleared, all beams are producing negative deviation signals. To assure that disabling unit 42 does not prevent those signals from resulting in production of a negative control signal by signal selector 37 to cause the aircraft to pitch downward, disabling unit 42 is itself disabled, as described, for an interval of about 15 seconds. By then the aircraft will have come close enough to the terrain below so that radar echo pulses are again being produced by the low beam in the interval between successive trigger pulses from radar unit 30. Consequently, the low beam deviation signal will be insufficient in magnitude to again operate disabling unit 42.

A great variety of circuits may be readily devised by those skilled in the radar arts to perform the functions of range pulse generator 31, comparator 33, signal selector 37, and disabling unit 42 as described with reference to Fig. 7. By way of example, typical specific circuits for these devices have been shown in Figs. 8 to 11.

Figure 8:
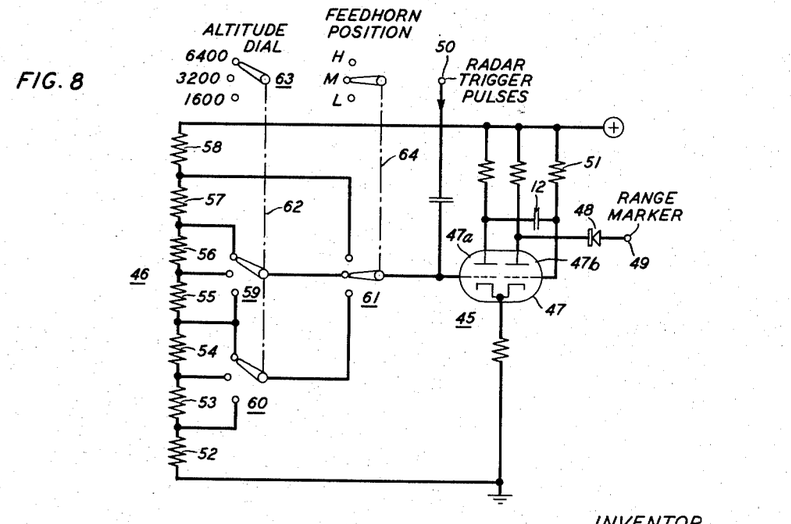
Fig. 8 is a circuit diagram of a typical range marker generator suitable for use in the circuit of Fig. 7.

The circuit in Fig. 8 is suitable for use as marker pulse generator 31 of Fig. 7. It comprises a monostable multivibrator 45 the bias voltage of which is controlled by a voltage divider 46. The circuit of multivibrator 45 is essentially the same as that shown in Fig. 32A on page 2–53 of "Principles of Radar," Massachusetts Institute of Technology, Radar School Staff, McGraw-Hill Book Company, Inc., 2nd edition, 1956. As described therein on pages 2–53 to 2–58, in the absence of trigger pulses applied to the grid of left-hand section 47a of a twin triode 47, the right-hand section 47b continuously conducts. The voltages at the anodes are constant and positive, and since the anode of section 47b is connected through a negatively poled diode 48 to output terminal 49, the voltage at the output terminal is then zero. When a positive trigger pulse is applied to terminal 50, which may be connected to the modulator (not shown) in radar unit 30 of Fig. 7, that pulse is conveyed via a coupling capacitor to the grid of triode section 47a and causes that section to become conductive. This, in turn, cuts off triode section 47b and results in production of a positive pulse at its anode. However, no output pulse is yet produced at terminal 49 due to the negative polarity of connection of diode 48. Triode 47 cannot remain in this state, however, because the grid of section 47b is returned to the positive side of the direct current supply via a resistor 51. Coupling capacitor 12 connected between the grid of triode section 47b and the anode of triode section 47a charges through this resistor, and the resultant exponential rise of voltage at the grid of section 47b eventually returns that section to the conductive state. The negative pulse which is then produced at its anode appears at output terminal 49, and constitutes the required range marker. The interval between the instant at which a trigger pulse is applied to the grid of section 47a and that at which a range marker is produced at terminal 49 is established by the bias of the grid of triode section 47a. If this bias is made more positive the interval is increased, while if it is made less positive the interval is decreased.

Voltage divider 46 comprises seven resistors 52 through 58 connected in series between ground and the positive side of the direct current supply for triode 47. Resistors 52 through 57 are all equal, while resistor 58 may be four or five times larger than the total series resistance of the rest. A three-position switch 59 is connected at its upper, middle and lower contacts, respectively, to the junction of resistors 56 and 57, 55 and 56, and 54 and 55. Another three-position switch 60 is connected at its upper, middle and lower contacts, respectively, to the lower contact of switch 59, the junction of resistors 53 and 54, and the junction of resistors 52 and 53. A third three-position switch 61 is connected at its upper, middle and lower contacts, respectively, to the junction of resistors 57 and 58, the arm of switch 59, and the arm of switch 60. The arm of switch 61 is connected to the grid of section 47a of triode 47. The arms of switches 59 and 60 are ganged by a linkage 62 which is controlled by the position of a manually operable pointer on a three-position altitude dial 63. Each pointer position corresponds to a particular average flight altitude, these altitudes being successively doubled in going from the low to the middle to the upper pointer positions. Linkage 62 moves the arms of switches 59 and 60 simultaneously to the ones of their three contacts corresponding to the setting of the pointer on dial 63. The arm of switch 61 is controlled by a mechanical linkage 64 so that it will be at its low, middle and upper contacts, respectively, in correspondence with the position of feedhorn 26 in Fig. 7. Linkage 64 is therefore most conveniently operated by the same motor 28 which operates linkage 29 in Fig. 7.

When the high beam is being produced by antenna 24, the arm of switch 61 will be at its upper contact. The bias applied to the grid of section 47a of triode 47 is then at its most positive value and, as explained above, the range markers produced at terminal 49 will be delayed most relative to the trigger pulses applied to the grid of section 47a. That is, the range marker generator assigns the maximum range to the high radar beam. The range assigned to this beam is not affected by the setting of altitude dial 63, since the latter does not control the point on voltage divider 46 to which the upper contact of switch 61 is connected.

The pointer positions of altitude dial 63 are calibrated in terms of three typical desired average altitudes which are the vertical heights to which the value of the distance $l$ assigned to the low beam must correspond in accordance with the relation: altitude $= l \sin x$. As shown in Fig. 8, these altitudes are 1600, 3200 and 6400 feet for the low, middle and upper pointer positions, respectively. When the pointer is set at 6400 feet, the arms of switches 59 and 60 will be set to their upper contacts. Accordingly, when the low radar beam is being produced by antenna 24 of Fig. 7 the arm of switch 61 is connected to the junction of resistors 54 and 55. The voltage at that point is thereby applied to the grid of triode section 47a. When the middle beam is being produced by antenna 24, the arm of switch 61 then being at its middle contact, the voltage applied to the grid of triode section 47a will be from the junction of resistors 56 and 57. This voltage is, of course, greater than that which existed for the low beam. Consequently, the range marker produced at output terminal 49 occurs after a longer delay in the case of the middle beam than for the low beam.

If now the pointer of altitude dial 63 is moved to its middle setting of 3200 feet, the bias voltage applied to the grid of triode section 47a will be derived from the junction of resistors 53 and 54 for the low beam and from the junction of resistors 55 and 56 for the middle beam. Since these voltages are less than before, the range markers produced for both of these beams occur after shorter delays. The ratio between them, however, remains substantially the same. It will be evident that if the altitude dial pointer should be moved to its lowest setting of 1600 feet, the range markers for the low and middle beams will occur at still shorter delays but still substantially in the same ratio as before. The pilot may, therefore, set the pointer of altitude dial 63 at the average altitude he wishes to maintain and the circuit of Fig. 8 will automatically adjust the distances assigned to the low and middle radar beams.

Figure 9:
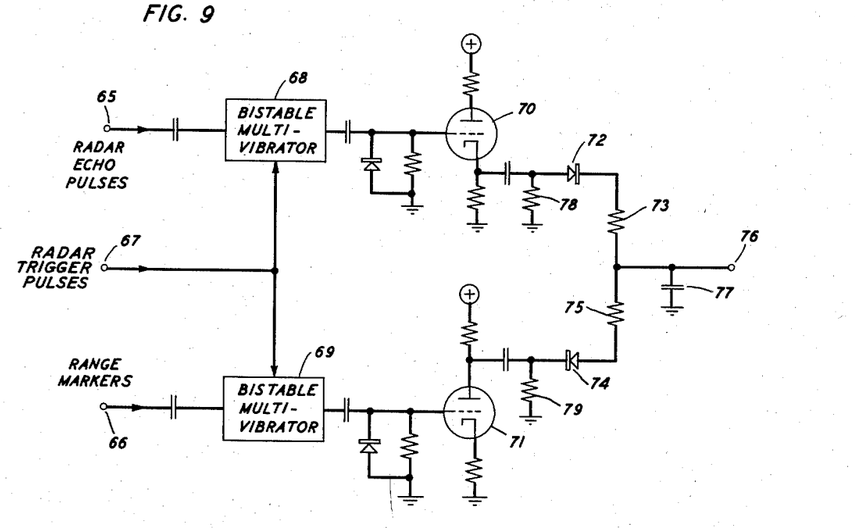
Fig. 9 is a circuit diagram of a typical comparator suitable for use in the circuit of Fig. 7.

In Fig. 9 is shown a suitable circuit for comparator 33 of Fig. 7. Echo pulses from radar unit 30 of Fig. 7 are applied to terminal 65 and marker pulses from range pulse generator 31 are applied to terminal 66. In addition, the trigger pulses applied to range pulse generator 31 from the modulator unit of radar 30 are also applied to terminal 67 of the circuit in Fig. 9. Terminals 65 and 66 are respectively connected to two bistable multivibrators, or "trigger circuits," 68 and 69. Each multivibrator is also connected to terminal 67, and is reset to an initial state in response to each trigger pulse applied to terminal 67 just prior to each transmitted radar pulse from antenna 24 in Fig. 7. Occurrence of a radar echo pulse at terminal 65 switches multivibrator 68 to its alternate state, resulting in production of a positive pulse at its output terminal. Similarly, occurrence of a range marker at terminal 66 switches multivibrator 69 to its alternate state and produces a positive output pulse therefrom. Multivibrators 68 and 69 are respectively coupled to the grids of two triodes 70 and 71. Each of these coupling paths may include a diode which shunts negative pulses to ground. The output of triode 70 is taken from its cathode, so that a positive pulse applied to the grid results in a positive output pulse. The output of triode 71 is taken from its anode, a more positive grid pulse thereby resulting in a negative output pulse. The cathode of triode 70 is connected through a blocking capacitor and a positively poled diode 72 to a resistor 73. The anode of triode 71 is connected through a blocking capacitor and a negatively poled diode 74 to a resistor 75. The other terminals of resistors 73 and 75 are connected in common to an output terminal 76 which is shunted by a grounded capacitor 77. A pair of grounded resistors 78 and 79 respectively shunt diodes 72 and 74 to provide ground return paths.

If a radar echo pulse occurs at terminal 65 prior to a range marker at terminal 66, the resultant positive pulse produced at the cathode of triode 70 passes through diode 72 and resistor 73 and begins to charge capacitor 77 to a positive potential. If then a range marker occurs, the negative pulse at the anode of triode 71 renders diode 74 conductive and the charge on capacitor 77 quickly leaks off through that diode and the anode-to-cathode path in triode 71. The net result is that a positive pulse is produced at terminal 76 by the radar echo pulse and is terminated by the range marker. If, however, the range marker should occur first, the negative pulse it produces at the anode of triode 71 begins to negative charge capacitor 77 to a negative potential. The subsequent radar echo produces a positive pulse at the cathode of triode 70 which dissipates the negative potential already attained by capacitor 77. Consequently, a negative pulse is produced at terminal 76 by the range marker and is terminated by the radar echo.

Referring to the description of comparator 33 given above with reference to Fig. 7, it will be seen that the circuit of Fig. 9 produces pulses of the required polarity as determined by the relative times of occurrence of the radar echo pulses and the range markers. In addition, the longer the interval between occurrence of a range marker and a radar echo the longer will capacitor 77 charge and the greater will be the amplitude of the output voltage at terminal 76. That voltage is, therefore, proportional to the average time delay between the echo pulses and the range markers for each of the beams. The voltage at terminal 76 will reach its maximum amplitude if no radar echo pulse is received during the interval between successive transmitted radar pulses. This fact is utilized by disabling unit 42 in Fig. 7, as described above, to detect absence of radar echo pulses from the low beam in any of those intervals.

Figure 10:
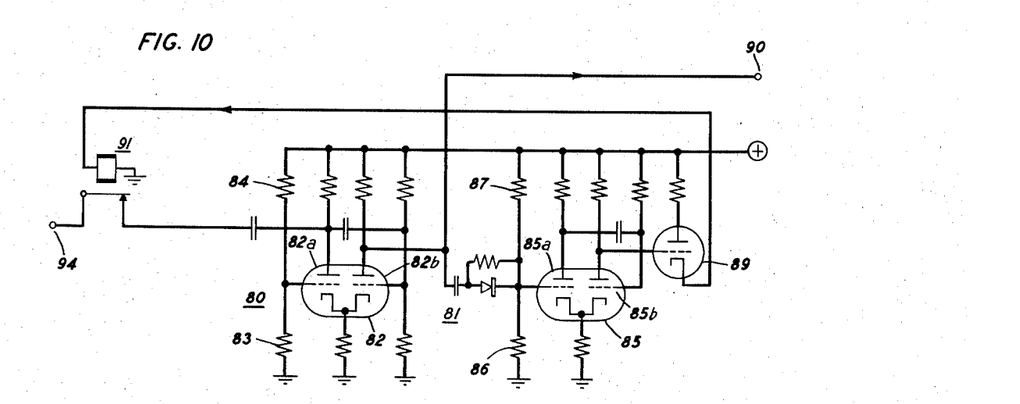
Fig. 10 is a circuit diagram of a typical disabling unit suitable for use in the circuit of Fig. 7.

In Fig. 10 there is shown an example of a specific circuit suitable for disabling unit 42 of Fig. 7. This circuit comprises two monostable multivibrators 80 and 81 each substantially the same as multivibrator 45 in the range marker generator circuit described above with reference to Fig. 8. Multivibrator 80 comprises a twin triode 82 having a left section 82a and a right section 82b. The grid of triode section 82a is connected to the junction of a pair of resistors 83 and 84 connected between ground and the positive direct voltage supply. The anode of triode section 82a is capacitively connected to the grid of section 82b, which is positively biased by the positive supply via a resistive voltage divider. Multivibrator 81 comprises a twin triode 85 having a left section 85a and a right section 85b, the grid of the former being connected to the junction of a pair of resistors 86 and 87 connected between ground and the positive supply. The anode of triode section 85a is capacitively connected to the grid of triode section 85b. The grid of triode section 85a is connected to the anode of triode section 82b of multivibrator 80 by a coupling capacitor and a diode in series, the latter being shunted by a large resistance. The anode of triode section 82b is further connected to an output terminal 90. In Fig. 7, terminal 90 would be connected to the winding of relay 15. The anode of triode section 85b of multivibrator 81 is connected to the grid of a triode 89 serving as a cathode follower. The cathode of triode 89 is connected to ground through the winding of a relay 91. A terminal 94 is connected in series with the contact of relay 91 and a blocking capacitor to the anode of triode section 82a. Terminal 94 is the input terminal of the disabling unit circuit, and in Fig. 7 would be connected to the contact of switch 43.

The circuits of multivibrators 80 and 81 are described in detail in the text "Principles of Radar" on the pages cited above. In accordance with that description, the ratio of resistors 83 and 84 may be set so that triode section 82b of multivibrator 80 is turned "off" for about four seconds after a negative pulse is applied to its grid. Similarly, the ratio of resistors 86 and 87 may be set so that triode section 85b of multivibrator 81 is turned "off" for about fifteen seconds after application of a negative pulse to its grid.

When the disabling unit is in the quiescent state, triode section 82b of multivibrator 80 is conducting, or "on," and triode section 82a is cut off, or "off." Similarly, in multivibrator 81 triode section 85b is "on" and triode section 85a is "off." The current then flowing in cathode follower triode 89 is insufficient to operate relay 91, so pulses applied to input terminal 94 will be conveyed to the grid of triode section 82b. Since that triode section is "on," positive pulses have little effect. A negative pulse however, if of sufficient amplitude to overcome the positive grid bias of triode section 82b, will turn that section "off." By adjusting that positive grid bias, the required amplitude of the negative pulse to turn triode section 82b "off" may be established equal to that of the negative pulse provided by comparator 33 when the low radar beam fails to produce an echo pulse from the peak being surmounted. The resultant positive voltage at the anode of triode section 82b when turned "off" appears at output terminal 90 and will operate relay 15 connected thereto as described above with reference to Fig. 7. After an interval which may be about four seconds, as described above, multivibrator 80 returns to its stable state with triode section 82a "off" and section 82b "on." This reduces the voltage at output terminal 90 to a value insufficient to keep relay 15 operated. The diode connected to the grid of triode section 85a is poled to prevent the latter from being affected by the drop in voltage at terminal 90.

When triode section 82b is initially turned "off," the positive pulse produced at its anode is conveyed to the grid of triode section 85a of multivibrator 81 and turns it "on." Concurrently, triode section 85b is turned "off" and its anode voltage rises. This causes triode 89 to conduct sufficiently to operate relay 91. Any subsequent pulse applied to terminal 94 is therefore isolated from multivibrator 80 and cannot again turn triode section 82b "off." However, after the approximately fifteen seconds interval during which triode section 85b is "off," that section turns "on" again due to the behavior of multivibrator 81. The anode voltage of triode section 85b then drops, the current conducted by triode 89 is reduced to a level at which relay 91 is again de-energized, and the entire circuit returns to its initial state. The net result is that a negative pulse applied at input terminal 94 cannot again trigger multivibrator 80 for about fifteen seconds after it has once been so triggered. This is the behavior required of disabling unit 42 in Fig. 7.

In Fig. 11 is shown a suitable circuit for signal selector 37 of Fig. 7. The incoming conductors from the upper, middle and lower contacts of switch 35 of that figure are designated respectively as H, M and L. The incoming conductor from direct current amplifier 41 of Fig. 7 is designated R, and conveys the voltage produced by radio altimeter 39 as described above with reference to Fig. 7. Conductor H is connected to the grid of the left section 101a of a twin triode connected in a conventional bistable multivibrator, or trigger circuit, essentially the same as that shown in Fig. 5.10 on page 168 of volume 19, "Waveforms," Massachusetts Institute of Technology Radiation Laboratory Series, McGraw-Hill Book Company, Inc., 1949. When the potential of conductor H becomes positive, left section 101a is turned "on" and right section 101b of the same twin triode is turned "off." A negative potential will reverse these states, while if no potential is applied to conductor H each triode section remains in its existing state. The anode of triode section 101b is connected to a positive direct voltage supply, indicated by +, through the winding of a relay 101c having a back contact. When triode section 101b is off, the absence of current through the winding of relay 101c results in closure of its back to the positive direct voltage supply. If, however, the potential of conductor H should become negative, triode section 101b will be turned on and its anode current operates relay 101c. This disconnects the positive voltage supply from the relay back contact. The combination of the described trigger circuit and relay 101c therefore functions together as a unit which will be identified as voltage switch 101 having an output terminal which is connected to a positive voltage supply when the potential of conductor H is positive. Switch 101 will then be considered to be "operated." Conductors M, L and R are also respectively connected to voltage switches 102, 103 and 104 which are the same in all respects as voltage switch 101.

The output terminal of switch 101 is connected to ground through the winding of a relay A. Relay A has two front contacts, A10 and A11, and three back contacts, A20, A21 and A22. The output terminals of switches 102, 103 and 104 are respectively connected in a similar manner to the windings of relays B, C and D the same as relay A. Each of these relays also has two front contacts and three back contacts, these being designated with the same numerals as the corresponding contacts of relay A and a letter identifying their relay.

It should be noted that, in the interest of clarity of the functional relationships between all relays in Fig. 11, and avoidance of the use of many intersecting lines, the contacts are shown detached from the relays themselves. Physically, of course, all contacts of a particular relay are a physical part thereof. This type of relay circuit diagram has been found to be more effective in conveying an understanding of circuit operation and construction.

Conductor H is connected through front contact A10 of relay A to one input terminal of a conventional summing amplifier 106 having an output terminal 107. Similarly, conductors M, L and R are respectively connected through front contacts B10, C10 and D10 of relays B, C and D to other individual input terminals of summing amplifier 106. The winding of relay A is connected at its ungrounded terminal to the positive direct voltage supply through the series connection of front contact A11 and back contacts B20, C20 and D20. The windings of relays B, C and D are also respectively connected to the positive direct voltage supply through four series-connected contacts which for relay B comprise B11, A20, C21 and D21; for relay C comprise C11, A21, B21 and D22, and for relay D comprise D11, A22, B22 and C22.

Note that each of these series connections includes one front contact and three back contacts.

Suppose that the potential of one of conductors H, M, L or R becomes positive. Assuming this to be conductor H, switch 101 will operate and energize relay A. Contact A10 closes, and the potential of conductor H is applied to amplifier 106. A positive output voltage is then produced at terminal 107. In addition, assuming that none of relays B, C or D have been operated, contacts B20, C20 and D20 are all closed. Operation of switch 101 as described closes contact A11, so that positive direct voltage is applied to the winding of relay A through the path comprising contacts D20, C20, B20 and A11 causing relay A to "lock-up" independently of the state of switch 101. Now if the potential of conductor H should become negative, relay A will still remain operated even though switch 101 is no longer operated and contact A10 will remain closed. A negative output voltage will then be produced at output terminal 107.

If the potential of one of the other conductors besides H, say M, should become positive, switch 102 as well as switch 101 will operate. This will close contacts B10 and B11 and open contacts B20, B21 and B22. The opening of contact B20 breaks the "lock-up" energizing path for relay A, so that its A10 contact will now only remain closed so long as switch 101 remains operated. If the potential of conductor H should become negative, contact A10 will open and that potential will be isolated from amplifier 106. Then, the positive potential of conductor M will be the only potential applied to amplifier 106 and the output voltage at terminal 107 will remain positive. Of course, if the potentials of two conductors such as H and M should be positive at any time, both will be applied to amplifier 106 and the voltage at output terminal 107 will, again, be positive and proportional to the sum of the potentials of conductors H and M. Since this description applies to the connection between amplifier 106 and each of conductors H, M, L and R, it is apparent that so long as the potential of any one of them is positive the voltage at output terminal 107 will be positive. However, if the potential of at least one is negative and none are positive, then and only then will the voltage at terminal 107 become negative. Note that only one negative input voltage at a time can contribute to the voltage at output terminal 107, conveyance of negative voltages being dependent on the relay locking paths of which only one can be closed at any time. Only the most recent of the potentials of conductors H, M, L and R to become negative can, therefore, be conveyed to terminal 107. This is precisely the mode of signal selection required of signal selector 37 as described above with reference to Fig. 7.

What is claimed is:

1. A system for controlling the altitude of an aircraft above terrain, comprising ranging means for producing a plurality of signals which respectively represent the ranges to terrain at a plurality of angles of elevation relative to the velocity vector of the aircraft, means for producing a plurality of marker signals which respectively represent a preassigned distance at each of said angles, and comparing means connected to the last-named means and to said ranging means to receive said range signals and said marker signals and to produce therefrom deviation signals respectively indicating the relative magnitudes of the range and preassigned distance at each of said angles.

2. An aircraft terrain avoidance and altitude control system, comprising means for establishing a plurality of beams at differing angles of elevation relative to the aircraft velocity vector, means for detecting the range to terrain of each of said beams, means connected to said detecting means for comparing the ranges of said beams with respective preassigned distances, and means connected to said comparing means for producing a selecting voltage of a predetermined type whenever the range of any of said beams is less than the preassigned distance for that beam.

3. A system for controlling the altitude of an aircraft above terrain, comprising transmitting means for producing a plurality of beams at various angles of elevation relative to the velocity vector of the aircraft, receiving means for deriving from each such beam a range signal which represents the range to terrain along that beam, means for producing a marker signal for each of said range signals which represents a preassigned distance to terrain along the same beam as that from which the range signal was derived, and comparing means connected to the last-named means and to said receiving means, said comparing means being adapted to produce a first type of deviation signal for each of those of said beams for which the range represented by the range signal is smaller than the distance represented by the marker signal and a second type of deviation signal for each of those of said beams for which the range represented by the range signal is greater than the distance represented by the marker signal.

4. An aircraft altitude control system comprising ranging means for producing a plurality of range signals respectively representing the range to terrain at a plurality of angles of elevation relative to the velocity vector of the aircraft, means for producing a plurality of marker signals which respectively represent a preassigned distance at each of said angles, comparing means connected to the last-named means and to said ranging means to receive said range signals and said marker signals, said comparing means being adapted to produce a first type of deviation signal for each of those of said angles at which the preassigned distance exceeds the range and a second type of deviation signal for each of those of said angles at which the range exceeds the preassigned distance, and selecting means connected to said comparing means to receive said deviation signals, said selecting means being adapted to produce a control signal which has a specified characteristic whenever any deviation signals applied thereto are of the first type and which has an alternative characteristic whenever at least one of the deviation signals applied thereto is of the second type and none are of the first type.

5. The system of claim 4, further comprising disabling means connected to said comparing means to receive the deviation signal for a selected one of said angles, said disabling means being adapted to produce a disabling signal of limited duration when the range at said selected angle exceeds the preassigned distance at that angle by more than a limiting amount, and means connected to said disabling means and to said selecting means for utilizing said disabling signal to prevent said selecting means from producing a control signal having said alternative characteristic.

6. The system of claim 4, further comprising altimeter means for measuring the vertical altitude of said aircraft above terrain, said altimeter means being adapted to produce a deviation signal of the first type whenever the vertical altitude of said aircraft is less than a desired average altitude, and means for applying the deviation signal from said altimeter means to said selecting means.

7. An aircraft altitude control system comprising transmitting means for producing a plurality of radar beams at various angles of elevation relative to the velocity vector of the aircraft, receiving means for deriving from each of said beams range signals which represent the range to terrain along that beam, means for producing a marker signal for each of said range signals which represents a preassigned distance to terrain along the same beam as that from which the range signal was derived, comparing means connected to the last-named means and to said receiving means to receive said marker signals and range signals, said comparing means being adapted to produce a first type of deviation signal for each of those of said beams of which the range signals precede the marker signals and a second type of deviation signal for each of those of said beams of which the marker signals precede the range signals, and selecting means connected to said comparing means to receive said deviation signals, said selecting means being adapted to produce a first control signal when any deviation signals applied thereto are of the first type and a second control signal when at least one of the deviation signals applied thereto is of the second type and none are of the first type.

8. The system of claim 7, further comprising disabling means connected to said comparing means to receive the deviation signal for a selected one of said beams, said disabling means being adapted to produce a disabling signal of limited duration when the range along said selected beam exceeds the preassigned distance along that beam by more than a limiting amount, and means connected to said disabling means and to said selecting means for utilizing said disabling signal to prevent said selecting means from producing said second control signal.

9. The system of claim 7, further comprising altimeter means for measuring the vertical altitude of said aircraft above terrain, said altimeter means being adapted to produce a deviation signal of the first type whenever the vertical altitude is less than a desired average altitude, and means for applying the deviation signal from said altimeter means to said selecting means.

10. An aircraft altitude control system comprising ranging means for producing a plurality of signals which respectively represent the ranges to terrain at a plurality of vertically displaced angles of elevation relative to the velocity vector of the aircraft, means for producing a plurality of marker signals which respectively represent successively greater preassigned distances at successive ones of said angles, and comparing means connected to the last-named means and to said ranging means to receive said range signals and marker signals, said comparing means being adapted to produce deviation signals respectively indicating the magnitude of the range to terrain relative to the preassigned distance at each of said angles.

11. An aircraft altitude control system comprising transmitting means for producing a first beam directed at an angle downward from the various angles of elevation relative to the velocity vector of the aircraft, a second beam directed along said velocity vector, and a third beam directed upward of said velocity vector, receiving means for deriving from each of said beams range signals which represent the range to terrain along that beam, means for producing a marker signal for each of said range signals which represents a preassigned distance to terrain along the same beam as that from which the range signal was derived, the preassigned distance for each beam being successively greater for said first, second and third beams in order, and comparing means connected to the last-named means and to said receiving means to receive said marker signals and range signals, said comparing means being adapted to produce a first type of deviation signal for each of those of said beams for which the range represented by the range signals is smaller than the distance represented by the marker signals and a second type of deviation signal for each of those of said beams for which the range represented by the range signals is greater than the distance represented by the marker signals.

12. A system for operating the elevator controls of an aircraft so as to control the altitude of the aircraft relative to terrain, comprising ranging means carried by said aircraft for producing a plurality of signals which respectively represent the range to terrain at a plurality of angles of elevation relative to a selected plane of reference of said aircraft, means for producing a plurality of marker signals which respectively represents a preassigned distance at each of said angles, comparing means connected to the last-named means and said ranging means to receive said marker signals and range signals, said comparing means being adapted to produce a first type of deviation signal for each of those of said angles at which the range represented by the range signals is smaller than the distance represented by the marker signals and a second type of deviation signal for each of those of said angles at which the range represented by the range signals is greater than the distance represented by the marker signals, selecting means connected to said comparing means to receive said deviation signals, said selecting means being adapted to produce a control signal having a specified characteristic when any one of said deviation signals is of the first type and having an alternative characteristic when at least one of said deviation signals is of the second type and none are of the first type, and means connected to said selecting means for operating the aircraft elevator controls to cause the aircraft to pitch upward when said control signal has said specified characteristic.

13. The system of claim 12, wherein the last-named means is further adapted to operate the aircraft elevator controls to cause the aircraft to pitch downward when said control signal has said alternative characteristic.

14. A system for operating the autopilot of an aircraft so as to control the altitude of the aircraft relative to terrain, comprising radar means carried by said aircraft for producing a plurality of radar beams at various angles of elevation relative to a selected plane of reference of said aircraft, said radar means being further adapted to derive from each such beam a range signal which represents distance to terrain along that beam, means for producing a marker signal for each of said range signals which represents a preassigned distance to terrain along the same beam as that from which the range signal was derived, comparing means connected to the last-named means and to said radar means to which said echo signals and marker signals may be applied, said comparing means being adapted to produce a first type of deviation signal for each of those of said beams of which the range signals precede the marker signals and a second type of deviation signal for each of those of said beams of which the marker signals precede the echo signals, selecting means connected to said comparing means to receive said deviation signals, said selecting means being adapted to produce a first control signal when any of said deviation signals are of the first type and a second control signal when at least one of said deviation signals is of the second type and none are of the first type, and means connected to said selecting means for utilizing the control signals therefrom to operate said autopilot to cause the aircraft to pitch upward when said selecting means produces said first control signal.

15. The system of claim 14, wherein the last-named means is further constructed and arranged to operate said autopilot to cause the aircraft to pitch downward when said selecting means produces said second control signal.

References Cited in the file of this patent

UNITED STATES PATENTS

| | | |
|---|---|---|
| 2,574,853 | Ward | Nov. 13, 1951 |
| 2,630,283 | Hanson | Mar. 3, 1953 |